United States Patent [19]

Mizushima et al.

[11] Patent Number: 5,294,576
[45] Date of Patent: Mar. 15, 1994

[54] MULLITE CERAMIC COMPOUND

[75] Inventors: Kihou Mizushima, Nagano; Michio Horiuchi, Koshoku, both of Japan

[73] Assignee: Shinko Electric Industries Co., Ltd., Nagano, Japan

[21] Appl. No.: 990,375

[22] Filed: Dec. 15, 1992

Related U.S. Application Data

[63] Continuation-in-part of Ser. No. 728,017, Jul. 8, 1991, abandoned, which is a continuation of Ser. No. 299,547, Jan. 11, 1989, abandoned.

[30] Foreign Application Priority Data

Jan. 13, 1988 [JP] Japan .................................. 63-5374

[51] Int. Cl.$^5$ .............................................. C04B 35/19
[52] U.S. Cl. ..................................... 501/128; 501/153; 501/154; 501/5
[58] Field of Search ..................... 501/5, 128, 153, 154

[56] References Cited

U.S. PATENT DOCUMENTS

| | | | |
|---|---|---|---|
| H,302 | 7/1987 | Nevitt et al. ........................... | 501/127 |
| 4,094,690 | 6/1978 | Morton ................................... | 501/95 |
| 4,201,561 | 5/1980 | Pierson et al. ........................ | 65/3012 |
| 4,336,303 | 6/1982 | Rittler .................................... | 501/18 |
| 4,770,673 | 9/1988 | Ketcham et al. ..................... | 501/103 |
| 4,935,390 | 6/1990 | Horiuchi et al. ..................... | 501/128 |
| 4,963,514 | 10/1990 | Horiuchi et al. ..................... | 501/128 |

FOREIGN PATENT DOCUMENTS

| | | |
|---|---|---|
| 0237103 | 9/1987 | European Pat. Off. . |
| 63-239154 | 10/1988 | Japan . |
| 3239154 | 10/1988 | Japan ............................ C04B 35/10 |
| 63-303856 | 12/1988 | Japan . |

OTHER PUBLICATIONS

"Fracture Toughness of $Al_2O_3$ with an Unstabilized $ZrO_2$ Dispensed Phase", Nils Claussen, Journal of American Ceramic Society, vol. 59, No. 1–2, Jan.–Feb. 1976, pp. 49–51.

"$K_{IC}$ Calculations for Some Mullite-Zirconia Composites Prepared by Reaction Sintering", de la Lastra et al., Journal of Materials Science Letters 4 (1985) 1099–1101.

"Structural Imperfections", Introduction to Ceramics, Chapter 4, pp. 125–139.

"Role of Impurities on Formation of Mullite from Kaolinite and $Al_2O_3SiO_2$ Mixtures", Johnson et al., Ceramic Bulletin, vol. 61, No. 8 (1982) pp. 838–842.

"Glass Properties in the Yttria-Alumina-Silica System", Hyatt et al., Communications of the American Ceramic Society, 70(10) Oct. 1987, pp. C-283–C-287.

Chemical Principles, Third Edition, Dickerson et al., 1979, pp. 49–51.

"Fracture Toughness of $Al_2O_3$ with an Unstabilized $ZrO_2$ Dispersed Phase": Nils Claussen; Journal of the American Ceramic Society; vol. 59, No. 1-2, pp. 49–51.

"$K_{aIC}$ Calculations for Some Mullite-Zirconia Composites Prepared by Reaction Sintering"; Baudin de la Lasztra et al.; Journal of Materials Science Letters 4 (1985): pp. 1099–1101.

"Structural Imperfections", (chapter 4); Introduction to Ceramics (1960) Kingery.

"Chemical Principles" Third Edition, 1979 pp. 49–51 by Dickerson et al.

Primary Examiner—Mark L. Bell
Assistant Examiner—C. M. Bonner
Attorney, Agent, or Firm—Staas & Halsey

[57] ABSTRACT

A mullite ceramic composition comprises mullite powder as a raw material; at least one of a rare earth element compound and an alkaline earth element compound; and at least one of a Group 6B vanadium compound, niobium compound and a tantalum compound, and the mixture is fired.

10 Claims, No Drawings

MULLITE CERAMIC COMPOUND

This application is a continuation-in-part of application Ser. No. 07/728,017, filed Jul. 8, 1991, now abandoned, which is a continuation of application Ser. No. 07/299,547, filed Jan. 11, 1989, now abandoned.

BACKGROUND OF THE INVENTION

1. Field of the Invention

The present invention relates to a mullite ceramic composition, and more particularly, to a mullite ceramic composition suitable for use as a material for electronic parts, such as a circuit board or a ceramic package for a semiconductor device.

2. Description of the Related Art

Current requirements for a high signal propagation speed in electronic parts, high-density packaging, and low cost, mean that a package and a substrate material which form the electronic parts must have a low dielectric constant, a thermal expansion coefficient close to that of a semiconductor element, a high mechanical strength, a high thermal conductivity, and a low production cost.

To satisfy these requirements ceramics such as an aluminum nitride ceramic, a silicon carbide ceramic, a low-temperature-fireable ceramic and a mullite ceramic have been developed.

The mullite ceramic is fired (or sintered) by adding in solid solution an alkaline earth element compound such as magnesium oxide to mullite powder as a sintering aid, but in a flattering process using a reburning step to straighten a bent fired ceramic, a problems arises in that flecks or spots are generated on the surface of or within the ceramic.

Particularly, in a white mullite ceramic, the generation of flecks greatly deteriorates the value thereof as a commercial product, and even if a coloring agent is added to the mullite ceramic, inhomogeneity of color occurs due to the generated flecks.

The present inventors have developed a mullite ceramic composition using a rare earth element compound such as yttrium oxide as a substitute for the alkaline earth element compound, as a sintering aid, to improve the mechanical strength of the above-mentioned conventional mullite ceramic, as disclosed in JP-A-62-140444.

Nevertheless, although this mullite ceramic has a high mechanical strength (flexural strength) flecks are still generated on the surface of or within the ceramic.

Further, to obtain a strong brazing adhesion to a metallized layer formed on a mullite ceramic surface, a large amount of the rare earth element compound is required, but this inclusion of a large amount of the rare earth in the compound causes flecks to be generated in a firing step before the flattering process. Further, even if the amount of rare earth contained is reduced, although flecks are not generated in the first firing step, such flecks are generated in the flattering step using a second firing process.

Further, flecks are easily generated when the firing temperature is relatively low, and therefore, it is difficult to set the most suitable firing conditions.

Furthermore, even if a coloring agent is added to the ceramic, the same problem arises, i.e., inhomogeneity of color caused by the flecks.

SUMMARY OF THE INVENTION

An object of the present invention is to provide a mullite ceramic composition wherein flecks causing inhomogeneity are not generated in a sintered body, and having other improved properties.

According to the present invention there is provided a mullite ceramic composition which comprises mullite powder as a raw material; at least one of rare earth element and alkaline earth element compounds; and at least one of the Periodic Table Group VB compounds of a vanadium compound, a niobium compound and a tantalum compound, said mixture being fired.

DESCRIPTION OF THE PREFERRED EMBODIMENTS

The preferred embodiments of the present invention will now be explained.

The mullite ceramic composition of the present invention comprises a mullite powder, at least one of rare earth element and alkaline earth element compounds added as a sintering aid, which are conventional additives, and further comprises at least one of a the Group VB selected from a vanadium compound, a niobium compound, and a tantalum compound.

According to the present invention, $V_2O_5$, $VF_5$, and $VCl_3$ vanadium compounds are preferably used. Also $Nb_2O_5$, $NbF_5$, and $NbCl_5$ niobium compounds, and $Ta_2O_5$, $TaF_5$, and $TaCl_5$ tantalum compounds are preferably used. "In the mullite" ceramic according to the present invention, no conventional flecks causing the inhomogeneity were generated, even though a flattering process was carried out, the amount of yttrium oxide was increased, and the firing temperature was varied. Further, even when a coloring agent such as $MoO_3$ was applied to the mullite ceramic of the present invention, no generation of flecks or spots occurred.

Although the reason for the appearance of the fleck or the spot within or on the surface of the conventional fired mullite is not clear, it is thought that the sintering aid, e.g., rare earth element compound, reacts with other elements to form a covalent composition, at a temperature of 1250° C. or less, according to a phase diagram whereby the formation temperature of liquid phase is lowered, and at the same time, the speed of the reaction between the mullite particles is varied, and the liquid phase composition is partly differentiated.

The present inventors have found that the generation of flecks or spots can be prevented by raising the formation temperature of the above-mentioned liquid phase by an addition of a vanadium compound, a niobium compound, or a tantalum compound.

The total amount of the vanadium, niobium and tantalum compounds is not particularly limited, but is advantageously from 0.1 to 10% by weight. When the total amount of such compounds is more than 10% by weight the resultant fired body is unpreferably colored yellow. When the amount of such compounds is less than 0.1% by weight, the effect of the prevention of the generation of flecks or spots is reduced.

The optimum total amount of vanadium compound, niobium compound or tantalum compound depends on the particle size or the particle purity of mullite powder or the kind or amount of the sintering aid. For example, when 0.5 to 3% by weight of yttrium oxide is added to mullite powder having a particle size of 1 μm as a sintering aid, about 0.1 to 0.2% by weight of niobium oxide is preferably added.

The total amount of the rare earth element compound and the alkaline earth element compound used is preferably from 0.1 to 20% by weight. The rare earth element compound and the alkaline earth element compound can be used separately or as a mixture thereof.

As the rare earth element, $Y_2O_3$, $YF_3$, $YCl_3$, $La(CO_3)_3$, $LaF_3$, $La(CO_3)_2$, $Ce_2(CO_3)_3$, $CeO_2$ and $CeF_3$, are preferably used, and as the alkali earth element compound, MgO, CaO, MgF, MgCl, $CaCO_3$, $CaF_2$, SrO, $SrCO_3$, BaO, $BaCO_3$ are preferably used. The optimum total amount of the sintering aid depends on the particle size or the particle purity of the mullite powder. For example, when the particle size of the mullite powder is about 1 μm, an amount of 0.5 to 3% by weight of yttrium oxide is advantageously used. Generally, the larger the particle size of the mullite powder, the greater the amount of the yttrium oxide used.

The mullite powder, is usually produced by mixing alumina and silicon dioxide and calcining the mixture to form mullite and pulverizing.

High purity mullite powder is recently obtained by, for example an electro-fusion method, and when a high purity mullite powder is used, a dense mullite ceramic composition having a high mechanical strength is obtained. If cost is not considered, a high purity and finely granulated mullite powder can be used in a method of thermal decomposition while admixing an intermediate product consisting of alkoxide or salts of Al or Si.

The firing of the present invention can be carried out at a temperature of 1300° to 1850° C. In this case, metal conductor metallized by using a conventional tungsten or molybdenum-manganese can be co-fired under the same conditions as conventionally required, i.e., at a temperature of 1500° to 1600° C.

The dielectric constant of the obtained mullite ceramic is low, the flexural strength is greater than that of the conventional product, and the same brazing properties were obtained. Note, the thermal expansion coefficient was slightly increased but this did not cause a problem.

The use of the rare earth element compound or the mixture of the rare earth element compound and alkaline earth element compound as a sintering aid, provided a remarkably improved flexural strength, metallized strength, and brazing strength than when only the alkali earth element compound was used. For example, when yttrium oxide is used as the sintering aid, the brazing strength is about twice that obtained when magnesium oxide is used.

Further, when metallized strength after firing is measured, the peel strength of an outer portion lead of the electric parts was 400 g/lead, in a case of addition of magnesium oxide. However, with the addition of 2% by weight of yttrium the peel strength, was enhanced to 700 g/lead. Further in addition of 5% by weight of yttrium the peel strength is remarkably increased.

The mullite ceramic composition is generally white, but when a powder having a particle size of 2 μm or less is used as the mullite powder, the fired mullite ceramic body has an improved translucency. Therefore, when a fired mullite ceramic substrate having a thickness of about 0.5 mm is placed over printed matter, large letters about 2 mm square in size can be read.

Accordingly, the mullite ceramic composition can be preferably used not only as an electronic part substrate and a ceramic package material but also as a material requiring a translucency, such as an arc tube surrounding body. On the other hand, when the mullite ceramic composition is used as a material which requires a shading property, it can be colored by applying a coloring agent thereto. A coloring agent which does not affect the inherent properties of the mullite product should be selected.

Coloring agents such as $TiO_2$, $Fe_2O_3$ and $Cr_3O_3$ are conventionally used for an alumina ceramic, but when 1% by weight of $Cr_2O_3$ is applied to the mullite ceramic, the coloring is unsatisfactory. Further, $Fe_2O_3$ and $TiO_2$ deteriorate the dielectric property of the fired ceramic body, in particular, $TiO_2$ remarkably and unpreferably increases the dielectric constant.

When $MoO_3$ is used, if even 1% by weight of $MoO_3$ is added a satisfactory coloring can be obtained. Further, when a small amount of $Cr_2O_3$ is added to the mullite ceramic of the present invention, together with the $MoO_3$, the coloring is improved and the mechanical strength is also improved, without lowering the inherent dielectric property of the product.

When a large amount of coloring agent, e.g., a total amount of 4% by weight, is added to a conventional alumina ceramic, the shading property is unsatisfactory, and the dielectric is increased.

However, as explained above, a colored mullite ceramic composition to which $MoO_3$ was added can be preferably used as a ceramic package requiring a property of shielding a semiconductor element from light.

To explain the present invention in more detail, examples of the present invention will now be described.

EXAMPLE 1

Two parts by weight of yttrium oxide and 1 part by weight of niobium oxide were added to 100 parts by weight of electro-fused mullite powder having an average particle diameter of about 2 μm, and an n-butanol-toluene mixed solution was mixed therewith by ball milling for 24 hours, as a dispersion medium.

Then 4 parts by weight of di-n-butyl phthalate and 8 parts by weight of polyvinyl butylar were added to the resultant mixture, and mixed by ball milling for 24 hours. The resultant mixture was vacuum-defoamed and cast into a sheet by a doctor blade process.

The density of the obtained green sheet was 1.91 g/cm³. This green sheet was then fired for 4 hours at a temperature of 1600° C. under atmospheric pressure in a weak reduction atmosphere, to obtain a fired body.

The density of the fired body was 3.16 g/cm³.

EXAMPLE 2

One part by weight of $MoO_3$ was added to the raw material composition of Example 1, and a green sheet was formed by the same processes as in Example 1, and fired. The density of the obtained green sheet was 1.93 g/cm³ and the density of the fired body was 3.20 g/cm³.

EXAMPLE 3

Two parts by weight of MgO and 1 part by weight of niobium oxide were added to the mullite powder of Example 1, and a green sheet was formed by the same processes as in Example 1, then fired. The density of the obtained green sheet was 1.92 g/cm³, and the density of the fired body was 3.20 g/cm³.

EXAMPLE 4

One and a half parts by weight of tantalum oxide were added instead of the 1 part by weight of niobium oxide of Example 1, and a green sheet was formed by the same processes as in Example 1, then fired. The density of the obtained green sheet was 1.94 g/cm³, and the density of the fired body was 3.13 g/cm³.

EXAMPLE 5

One part by weight of vanadium oxide was added instead of the 1 part by weight of niobium oxide of Example 1, and a green sheet was formed by the same processes as in Example 1, then fired. The density of the obtained green sheet was 1.87 g/cm³, and the density of the fired body was 3.05 g/cm³.

COMPARATIVE EXAMPLE 1

Two parts by weight of $Y_2O_3$ was added to 100 parts by weight of electro-fused mullite powder having an average particle diameter of about 2 μm and a green sheet was formed by the same processes as in Example 1, and fired. The density of the green sheet was 1.92 g/cm³, and the density of the fired body was 3.14 g/cm³.

COMPARATIVE EXAMPLE 2

One part by weight of the molybdenum oxide was added to the same raw material composition as in comparative example 1, and a green sheet was formed by the same processes as in Example 1, then fired. The density of the green sheet was 1.94 g/cm³, and the obtained density of the fired body was 3.16 g/cm³.

COMPARATIVE EXAMPLE 3

Two parts by weight of MgO were added to the same mullite powder as in Example 1, and a green sheet was formed by the same processes as in Example 1, and fired. The density of the obtained green sheet was 1.92 g/cm³, and the density of the fired body was 3.11 g/cm³.

The results of measurements of the properties of the obtained mullite ceramics are shown in Table 1. When the sintering aid was added as a haloid, it was changed to oxide during firing. Thus the effect of the haloid was the same as that of the oxide.

TABLE 1

| | ADDITIVES | DIELECTRIC CONSTANT (1 MHz 20° C.) | FLEXURAL STRENGTH (kg/mm²) | THERMAL EXPANSION COEFFICIENT ($\times 10^{-6}$/°C.) | COLOR | FLECK GENERATION |
|---|---|---|---|---|---|---|
| Example 1 | $Y_2O_3$ (2 wt %) $Nb_2O_5$ (1 wt %) | 6.5 | 22.7 | 4.5 | White | — |
| Comparative Example 1 | $Y_2O_3$ (2 wt %) | 6.4 | 21.2 | 4.2 | White | ∘ |
| Example 2 | $Y_2O_3$ (2 wt %) $MoO_3$ (1 wt %) $Nb_2O_5$ (1 wt %) | 7.0 | 26.0 | 4.9 | Black | — |
| Comparative Example 2 | $Y_2O_3$ (2 wt %) $MoO_3$ (1 wt %) | 6.9 | 24.5 | 4.5 | Black | ∘ |
| Example 3 | MgO (2 wt %) $Nb_2O_5$ (1 wt %) | 6.6 | 17.6 | 4.3 | White | — |
| Comparative Example 3 | MgO (2 wt %) | 6.4 | 16.1 | 4.1 | White | ∘ |
| Example 4 | $Y_2O_3$ (2 wt %) $Ta_2O_5$ (1.5 wt %) | 7.0 | 20.6 | 4.3 | White | — |
| Example 5 | $Y_2O_3$ (2 wt %) $V_2O_5$ (1 wt %) | 6.5 | 21.9 | 4.5 | Black | — |

We claim:

1. A sintered homogenous mullite ceramic composition, consisting essentially of:
    mullite powder;
    at least one rare earth element compound and alkaline earth metal element compound, wherein said rare earth element compound is selected from the group consisting of $Y_2O_3$, $YF_3$, $YCl_3$, $La_2O_3$, $Ce_2(CO_3)_3$, $La_2(CO_3)_3$, $CeO_2$ and $CeF_3$; and
    at least one vanadium compound, niobium compound and tantalum compound in an amount between 0.1–3 wt%.

2. A sintered homogenous mullite ceramic composition, consisting essentially of:
    mullite powder;
    at least one rare earth element compound and alkaline earth metal element compound; and
    at least one vanadium compound, niobium compound and tantalum compound in an amount between 0.1–3 wt%, wherein said vanadium compound is selected from the group consisting of $V_2O_5$, and $VF_5$.

3. A sintered homogenous mullite ceramic composition, consisting essentially of:
    mullite powder;
    at least one rare earth element compound and alkaline earth metal element compound; and
    at least one vanadium compound, niobium compound and tantalum compound in an amount between 0.1–3 wt%, wherein said niobium compound is selected from the group consisting of $Nb_2O_5$, $NbF_5$ and $NbCl_5$.

4. A sintered homogenous mullite ceramic composition, consisting essentially of:
    mullite powder;
    at least one rare earth element compound and alkaline earth metal element compound; and
    at least one vanadium compound, niobium compound and tantalum compound in an amount between 0.1–3 wt%, wherein said tantalum compound is selected from the group consisting of $Ta_2O_5$, $TaF_5$ and $TaCl_5$.

5. The composition according to claim 1, 2, 3 or 4, further comprising the colorant $MoO_3$.

6. A mullite ceramic composition according to claim 1, 2, 3, or 4, wherein said alkaline earth metal element compound is selected from the group of MgO, CaO, $MgF_2$, $MgCl_2$, $CaCO_3$, $CaF_2$, SrO, $SrCO_3$, BaO and $BaCO_3$.

7. A mullite ceramic composition according to claim 1, 2, 3 or 4, wherein a total amount of the at least one rare earth element compound and the alkaline earth element compound is from 0.1 to 20% by weight.

8. The composition according to claim 1, 2, 3 or 4, wherein the composition is translucent.

9. A sintered homogenous mullite composition consisting essentially of mullite, at least one rare earth element compound and alkaline earth metal element compound and 0.1–3 wt% of at least one vanadium compound, niobium compound and tantalum compound produced by the process of:

mixing said mullite with said at least one rare earth element compound and alkaline earth metal element compound and said at least one vanadium compound, niobium compound and tantalum compound to form a homogenous mixture and then sintering this mixture.

10. The composition according to claim 9, wherein the sintering occurs in the range of 1300°–1850° C.

* * * * *

UNITED STATES PATENT AND TRADEMARK OFFICE
CERTIFICATE OF CORRECTION

PATENT NO. : 5,294,576
DATED : March 15, 1994
INVENTOR(S) : Mizushima et al.

It is certified that error appears in the above-indentified patent and that said Letters Patent is hereby corrected as shown below:

TITLE PAGE, [57] ABSTRACT, line 4, "6B" should be --5B--.

Col. 1, line 30, "in" should be deleted;

line 31, "solid solution" should be deleted.

Col. 2, line 23, "of a the" should be --of the--;

line 24, "VB" should be --VB elements--;

line 30, ""In the mullite"" should be --In the mullite--.

Col. 3, line 6, "La(-" should be --$La_2O_3$--;

line 7, "$CO_3)_3$," should be deleted;

line 7, "$La(CO_3)_2$," should be --$La_2(CO_3)_3$,--;

line 8, "alkali" should be --alkaline--;

line 9, "MgF, MgCℓ," should be --$MgF_2$, $MgCl_2$,--;

line 19, "powder," should be --powder--;

line 22, "is recently" should be --has recently been--;

UNITED STATES PATENT AND TRADEMARK OFFICE
CERTIFICATE OF CORRECTION

PATENT NO. : 5,294,576
DATED : March 15, 1994
INVENTOR(S) : Mizushima et al.

It is certified that error appears in the above-indentified patent and that said Letters Patent is hereby corrected as shown below:

line 23, "example" should be --example,--;

line 55, "strength," should be --strength--;

line 56, "in" should be --with the--.

Col. 4,   line 7, "$Cr_3O_3$" should be --$Cr_2O_3$--.

Col. 6,   line 35, "the" should be --a--.

Signed and Sealed this

Twenty-second Day of November, 1994

Attest:

BRUCE LEHMAN

*Attesting Officer*      *Commissioner of Patents and Trademarks*